Oct. 5, 1926.
E. A. CUNNIFF
LOOM TEMPLE
Filed April 24, 1926
1,601,854
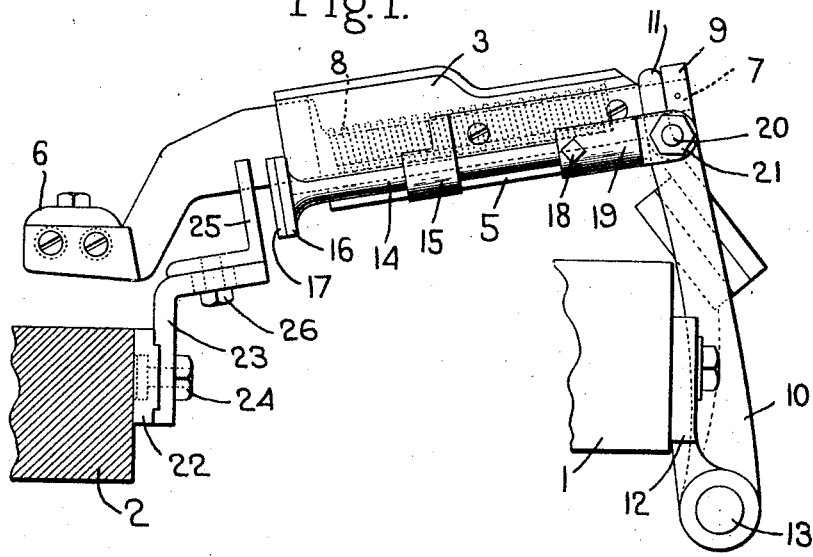
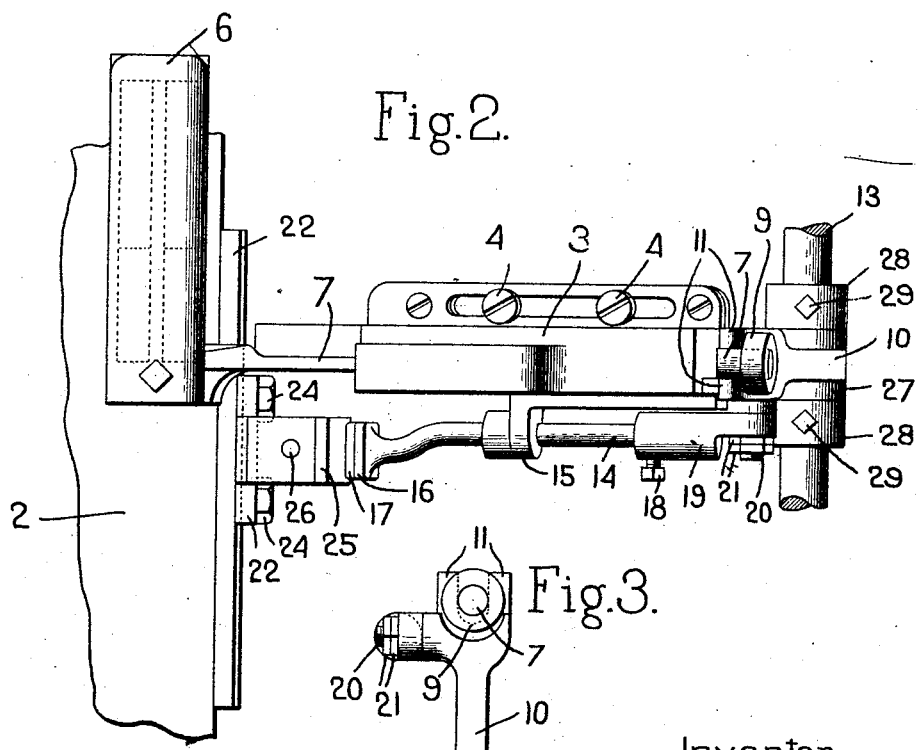
Inventor.
Edward A. Cunniff
by Heard Smith & Tennant.
Attys.

Patented Oct. 5, 1926.

1,601,854

UNITED STATES PATENT OFFICE.

EDWARD A. CUNNIFF, OF WALTHAM, MASSACHUSETTS, ASSIGNOR TO DRAPER CORPORATION, OF HOPEDALE, MASSACHUSETTS, A CORPORATION OF MAINE.

LOOM TEMPLE.

Application filed April 24, 1926. Serial No. 104,309.

This invention relates to loom temples. The temple in a loom is commonly mounted for longitudinal reciprocation forwardly and rearwardly in a stand mounted on the breast beam. The rearward movement is given by a spring and the forward movement through the medium of the lay at each beat-up. While this forward movement is comparatively slight, it is desirable and necessary, in order to prevent damage to the reed and take care of any inaccuracy in adjustment of the mounting of the temple stand on the breast beam.

In the usual constructions of temple mechanism, there is apt to be more or less binding between the temple shank and temple stand during the forward movement of the temple against the action of the spring.

The object of the present invention is to provide a simple and efficient mechanism for preventing such binding action by effecting the forward movement of the temple by a pull in line with the shank.

These and other objects and features of the invention will appear more fully from the accompanying description and drawings and will be particularly pointed out in the claims.

Since the invention relates entirely to the mechanism for giving the forward movement to the temple upon each beat-up of the lay, and since the mechanism is adapted to a wide variety of temples and looms, all of which are well known and familiar to those skilled in the art, it is only necessary here to illustrate and describe those parts of a loom and of an ordinary type of temple sufficient to a disclosure of the present invention.

In the drawings:—

Fig. 1 is a view partially in vertical cross section of a portion of a loom with a mechanism embodying the present invention shown in side elevation.

Fig. 2 is a top plan view of the construction shown in Fig. 1.

Fig. 3 is a front end elevation showing the detail of the connection at the forward end of the temple shank.

A portion of a breast beam 1 and a portion of a lay 2 of a loom are illustrated with the lay nearing the end of the beat-up. The temple stand 3 is shown as a box-like structure of a usual form rigidly secured by means of bolts 4 to a support 5 on the breast beam. The temple 6, which may be of any familiar type, is provided with the usual forwardly extending shank 7 mounted for longitudinal reciprocation in the stand 3. A helical spring 8, as usual, is mounted in the stand engaging at its rearward end a shoulder on the shank and at its forward end the stand itself and acts to project the temple rearwardly to its normal position.

In this invention the forward movement of the temple is secured by giving a direct forward pull to the forward end of the temple shank in line with the shank so that any binding action between the temple shank and the temple stand is prevented during this movement. In the preferred form of construction illustrated, the shank 7 at its forward end has rigidly secured thereto a collar 9, thus forming a shoulder. An arm 10 is forked or bifurcated at its upper end 11 and straddles the shank 7 directly behind the shoulder formed by the collar 9. This arm is pivotally mounted on a bracket 12 secured to the breast beam. The parts are so proportioned that the arm 10 stands normal, or at right angles, to the shank, as shown in Fig. 1, and the pivotal axis 13 extends transversely of, and at right angles to, both the arm 10 and the shank 7. Consequently it will be seen that, as the longitudinal movement of the shank is comparatively slight, a forward swinging movement of the arm will draw the temple and shank forwardly by a pull in line with the shank.

The swinging movement of the arm is effected by the lay upon the beat-up. In the preferred construction illustrated, a thrust bar or actuator 14 is mounted to slide freely in a bracket 15 secured to the temple stand 3. This bar moves substantially parallel with the shank and at its rearward end is provided with an enlarged head 16, preferably faced with leather 17, and at its forward end has adjustably secured thereto by the set screw 18 a socket member 19 pivotally connected to a stud 20 projecting laterally from the upper end of the arm 10. Lock nuts 21 threaded on the stud 20 hold the socket member 19 in place.

The lay 2 is provided with a bunter adjustably mounted to secure accurate engagement with the head of the thrust bar or actuator. This bunter, in the preferred construction illustrated, comprises a base plate 22 secured to the face of the lay, a bracket 23 keyed to the base plate and laterally adjustable thereon by means of the bolts 24, and a bunter arm 25 longitudinally adjustable of the bracket 23 by means of the bolt 26.

The arm 10 is accurately aligned with the shank 7 by having its hub 27 positioned between two collars 28, adjustably secured by means of the set screws 29 on the pivotal shaft 13. The shaft 13 and its supporting brackets 12 may be a part, such as the starter rod forming the part of the usual loom mechanism, or may be especially provided for the purposes of the present invention.

Having thus described the invention, what is claimed as new, and desired to be secured by Letters Patent, is:—

1. In a loom having a breast beam and a lay, a temple stand mounted on the breast beam, a temple having a shank mounted for longitudinal reciprocation in the stand, a spring acting to project the temple rearwardly, and means engaging the forward end of the temple shank and actuated by the lay upon the beat-up to move the temple forwardly by a pull in line with the shank, thus to prevent binding between the temple shank and stand.

2. In a loom having a breast beam and a lay, a temple stand mounted on the breast beam, a temple having a shank mounted for longitudinal reciprocation in the stand, a spring acting to project the temple rearwardly, an arm extending substantially normal to the temple shank, engaging the forward end thereof, and pivotally mounted on an axis extending transversely of, and at right angles to, both the arm and shank, and means actuated by the lay upon the beat-up to rock the arm forwardly and thus move the temple forwardly by a pull in line with the shank thus to prevent binding between the temple shank and stand.

3. In a loom having a breast beam and a lay, a temple stand mounted on the breast beam, a temple having a shank mounted for longitudinal reciprocation in the stand, a spring acting to project the temple rearwardly, an arm extending substantially normal to the temple shank, engaging the forward end thereof, and pivotally mounted on an axis extending transversely of, and at right angles to, both the arm and shank, a thrust bar connected to the arm and guided on the temple stand, and a bunter on the lay acting upon the beat-up to engage the thrust bar and move the temple forwardly by a pull in line with the shank thus to prevent binding between the temple shank and stand.

4. In a loom having a breast beam and a lay, a temple stand mounted on the breast beam, a temple having a shank mounted for longitudinal reciprocation in the stand and shouldered at its forward end, a forked arm engaging the shank in the rear of the shouldered forward end, and a thrust actuator connected to the arm and actuated by the lay upon the beat-up to move the temple forwardly by a pull in line with the shank thus to prevent binding between the temple shank and stand.

In testimony whereof, I have signed my name to this specification.

EDWARD A. CUNNIFF.